Patented Oct. 4, 1938

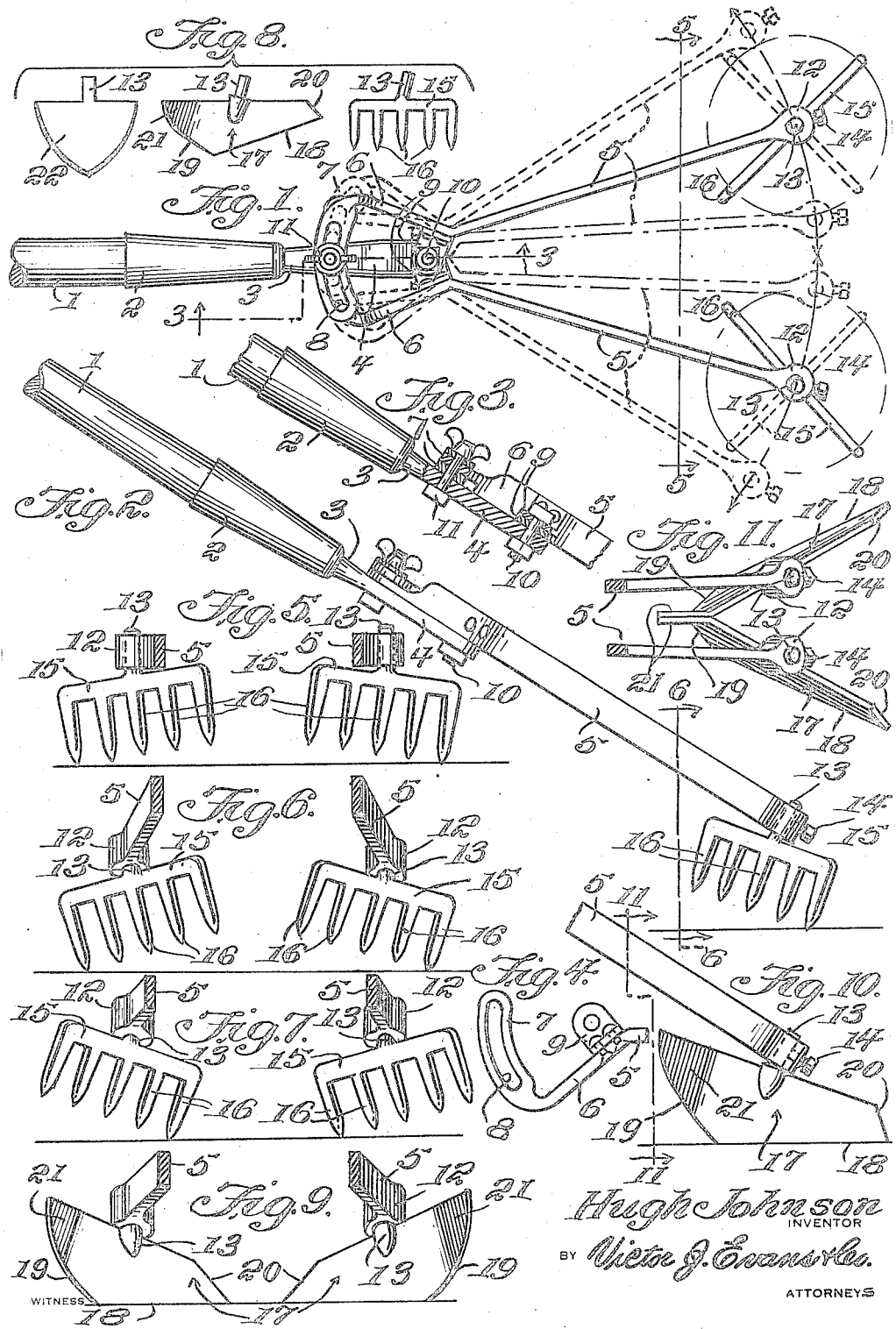

2,132,300

UNITED STATES PATENT OFFICE 2,132,300

GARDEN TOOL

Hugh Johnson, Reidsville, N. C.

Application August 15, 1936, Serial No. 96,267

1 Claim. (Cl. 97—70)

This invention relates to garden tools, and its general object is to provide a tool of that character, that includes interchangeable tool heads of various types, such as rakes, plowshares, cultivator shovels and the like, with the heads arranged in pairs and being adjustable toward and away from each other, as well as at various angles, in order to cultivate the soil in a manner to meet all conditions thereof and to throw the soil either toward or away from plants arranged in row formation, with the result my tool is capable of performing all work necessary in the preparation and care of a garden, and in an easy and expeditious manner, with minimum effort on the part of the user.

Another object of the invention is to provide a tool of the character set forth, that is simple in construction, inexpensive to manufacture and extremely efficient in operation, use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a fragmentary view of the tool which forms the subject matter of the present invention, and showing certain positions of the parts in full and dotted lines.

Figure 2 is a side elevation thereof.

Figure 3 is a sectional view taken approximately on line 3—3 of Figure 1.

Figure 4 is a fragmentary detail view of one of the tool head carrying arms.

Figure 5 is a sectional view taken approximately on line 5—5 of Figure 1, looking in the direction of the arrows, with the tool disposed in a substantially horizontal position.

Figure 6 is a similar view with the tool raised for disposal at an angle.

Figure 7 is a similar view with the tool heads reversed for disposal at an opposed angle to that shown in Figure 6.

Figure 8 is a view illustrating some of the various types of tool heads used with my device.

Figure 9 illustrates the application of the plowshare type of heads to the head receiving or carrying arms, and arranged in one position with respect to each other, or in a position to straddle a row of plants.

Figure 10 is a side elevation showing the plowshares arranged in another position.

Figure 11 is a sectional view taken approximately on line 11—11 of Figure 10, looking in the direction of the arrows, and illustrates the position of the shares when using the tool between rows of plants.

Referring to the drawing in detail, the reference numeral 1 indicates the handle of my device, which of course may be of any desired length and is preferably secured within a socket member 2, that is tapered and in the form of a ferrule, with a shank 3 extending therefrom, and the shank may be formed on the socket member and provided with a portion within the socket to be embedded in the handle. However, any suitable structure may be provided for securing the handle with respect to the shank and the latter includes a flat portion 4 having spaced openings therein.

The tool head carrying arms of my device are indicated by the reference numeral 5 and are preferably of strip formation as shown. The arms are bent intermediate their ends to provide relatively long outer diverging portions and relatively short inner diverging portions, the latter being indicated by the reference numeral 6 and terminating in relatively wide flat arcuate portions 7, each of which is provided with a slot 8 that follow the shape thereof, as clearly shown in Figure 4. Secured to the diverging portions 6 are one of the portions of angle brackets 9 that have openings in the other portions thereof to receive the bolt of a bolt and nut connection 10, the bolt passing through the opening at the outer end of the shank for pivotally securing the arms accordingly, whereby the outwardly extending portions of the arms are movable toward and away from each other, as will be apparent upon inspection of Figure 1.

In order to hold the arms in adjusted positions, with respect to each other, it will be noted that the arcuate portions are disposed in superimposed relation with respect to each other with the slots thereof in registration, to receive the bolt of the bolt and nut connection 11, the bolt passing through the opening adjacent the inner end of the shank, and disposed between the uppermost arcuate portion and the nut is a washer which bears against the same when pressure is applied to the washer, by the nut, and it will be noted that the latter is of the wing type, to facilitate the adjustment, as will be apparent.

The outer ends of the arms 5 terminate in eyes 12 to receive the shanks 13 of any pair of tool heads of the type as shown in Figure 8, and the shanks are held fixed within the eyes by set screws 14.

While I have illustrated the use of three different types of tool heads, it will be obvious that other types may be used, but the types shown will generally suffice for any kind of work desired in the preparation and care of a garden.

One type of tool head is in the form of a rake, in that it includes an elongated body 15 having teeth or tines 16 formed on and depending therefrom. The shank 13 of the rake type of tool head is disposed at a lateral angle with respect to the body thereof, as best shown in Figure 8, and the purpose for the angle arrangement of the shank is for disposing the rake heads at various angles with respect to each other, as shown in Figures 6 and 7, it being obvious that the position of the rake heads in Figure 7 is reversed from that shown in Figure 6, and when in the position as shown in Figure 6, the rake heads will build up a furrow about a row of plants, while in Figure 7 the soil will be removed from about the row.

The plowshare head likewise has its shank disposed at a lateral angle with respect to the body 17 thereof, and the body as best shown in Figure 8 is of elongated formation, with a straight upper edge, an inclined lower edge 18, a curved side edge 19 that merges into the lower end of the lower edge 18, and an outwardly directed or inclined side edge 20. The corner of the body at the juncture of the curved side edge 19 with a straight upper edge is bent for disposal at an inclined angle with respect to the remaining portion of the body, and the angle portion is indicated by the reference numeral 21.

The plowshare heads are likewise movable or adjusted in various positions with respect to each other as best shown in Figures 9 and 11, and as shown in Figure 9, they are disposed for arrangement upon opposite sides of a row of plants, in a manner whereby the soil will be thrown away from the plants, while in Figure 11 the plowshare heads are disposed together with the arrangement of the arms 5, for movement between two rows of plants for building up a furrow or throwing the soil about the rows.

The cultivator shovel head includes a substantially triangular shaped body 22 having the shank 13 thereof extending from its upper edge at right angles with respect thereto, but of course, the shank 13 of the cultivator shovel head can be inclined like the shanks of the other tool heads, if desired. The body 22 is preferably transversely curved with its apex portion forwardly curved, as suggested in Figure 8.

From the above description and disclosure of the drawing, it will be obvious that the tool heads are not only adjustable at various angles horizontally and vertically with respect to the carrying arms thereof, but the arms are movable or adjustable for positioning the tool heads toward and away from each other, and are held in the adjusted positions during the use thereof. It will be further obvious that the tool can be used either in a chopping manner, or can be drawn through the soil, with the tool heads between two rows of plants or upon the opposite sides of a single row of plants, it depending upon the kind of cultivation of the soil necessary or desired.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A garden tool comprising handled means including a flat shank, a pair of arms bent intermediate their ends to provide relatively long outer diverging portions and relatively short inner diverging portions, angle brackets secured to the inner portions adjacent to their juncture with the outer portions, said angle brackets being connected to the flat shank for pivotally connecting the arms for movement of the outer portions thereof toward and away from each other, flat arcuate shaped portions formed on the inner portions at substantially right angles thereto and directed toward each other for disposal in overlapped association, means for adjustably securing the arcuate shaped portions to the shank and for holding the arms in adjusted positions with respect to each other, and tool heads including bodies having shanks arranged at a lateral angle with respect thereto and secured to the outer ends of the arms in a manner for adjustment in horizontal and vertical planes for disposal at various angles with respect to the arms and each other in said planes.

HUGH JOHNSON.